(12) United States Patent
Poon et al.

(10) Patent No.: US 10,656,971 B2
(45) Date of Patent: May 19, 2020

(54) AGILE FRAMEWORK FOR VERTICAL APPLICATION DEVELOPMENT AND DELIVERY

(71) Applicant: DELL PRODUCTS L.P., Round Rock, TX (US)

(72) Inventors: Stanley K. Poon, Los Altos, CA (US); Maisa C. Manoel, Austin, TX (US); Yao Lu, Palo Alto, CA (US); Gavin D. Scott, Austin, TX (US); Andrew T. Miller, Austin, TX (US); Michael D. Condon, Cedar Park, TX (US); Kevin S. Borden, Austin, TX (US); Praharsh S. Shah, Fremont, CA (US); Roger W. Faulkner, San Jose, CA (US); James Watt, Pflugerville, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 1422 days.

(21) Appl. No.: 14/170,482

(22) Filed: Jan. 31, 2014

(65) Prior Publication Data
US 2015/0220325 A1    Aug. 6, 2015

(51) Int. Cl.
*G06F 8/35* (2018.01)
*G06F 8/36* (2018.01)
*G06F 9/54* (2006.01)

(52) U.S. Cl.
CPC .................. *G06F 9/54* (2013.01); *G06F 8/35* (2013.01); *G06F 8/36* (2013.01)

(58) Field of Classification Search
None
See application file for complete search history.

(56) References Cited

U.S. PATENT DOCUMENTS

| | | | |
|---|---|---|---|
| 5,615,400 A | 3/1997 | Cowsar et al. | |
| 6,516,312 B1 | 2/2003 | Kraft et al. | |
| 7,657,612 B2 | 2/2010 | Manchester et al. | |
| 7,676,452 B2 | 3/2010 | Doganata et al. | |
| 7,730,447 B2* | 6/2010 | Ringseth | G06F 8/20 717/106 |
| 7,802,234 B2* | 9/2010 | Sarukkai | G06F 11/3447 717/100 |
| 8,327,351 B2 | 12/2012 | Paladino et al. | |
| 8,356,027 B2 | 1/2013 | Jaecksch et al. | |
| 8,375,044 B2 | 2/2013 | Zabokritski et al. | |
| 2003/0014733 A1* | 1/2003 | Ringseth | G06F 8/20 717/116 |

(Continued)

*Primary Examiner* — Jason D Mitchell
(74) *Attorney, Agent, or Firm* — Jackson Walker LLP; Christopher J. Rourk

(57) ABSTRACT

A software development platform comprising one or more user-selectable modular units containing a vertical stack of back-end business logic. One or more user-selectable modular units containing domain model components. One or more user-selectable modular units containing front end presentation components. A virtual appliance comprising application-specific logic that includes one or more of the modular units containing the vertical stack of back-end business logic, one or more of the user-selectable modular units containing the domain model components and one or more of the user-selectable modular units containing front end presentation components.

20 Claims, 7 Drawing Sheets

(56) References Cited

U.S. PATENT DOCUMENTS

| | | | |
|---|---|---|---|
| 2003/0204740 A1* | 10/2003 | Shapiro | H04L 63/20 726/4 |
| 2003/0208743 A1* | 11/2003 | Chong | G06F 8/10 717/106 |
| 2005/0021355 A1* | 1/2005 | Brendle | G06F 17/3056 705/1.1 |
| 2006/0112175 A1 | 5/2006 | Sellers et al. | |
| 2006/0259577 A1* | 11/2006 | Fritsch | H04L 41/5054 709/217 |
| 2008/0127032 A1* | 5/2008 | Mital | G06F 8/70 717/100 |
| 2008/0141213 A1* | 6/2008 | Dorn | G06F 9/545 717/100 |
| 2008/0189235 A1* | 8/2008 | Mital | G06F 8/34 706/52 |
| 2008/0281861 A1* | 11/2008 | Booz | G06F 8/315 |
| 2009/0113385 A1* | 4/2009 | Appleyard | G06F 8/10 717/108 |
| 2009/0125977 A1* | 5/2009 | Chander | G06F 8/36 726/1 |
| 2009/0138940 A1* | 5/2009 | Liu | G06F 21/62 726/1 |
| 2009/0178026 A1* | 7/2009 | Mital | G06F 8/36 717/120 |
| 2012/0054625 A1* | 3/2012 | Pugh | G06F 21/41 715/736 |
| 2012/0259801 A1 | 10/2012 | Ji et al. | |
| 2013/0104067 A1* | 4/2013 | Sullivan | G06F 8/38 715/772 |
| 2015/0089475 A1* | 3/2015 | Geng | G06F 8/71 717/121 |
| 2015/0212812 A1* | 7/2015 | Tripathi | G06F 8/70 717/120 |
| 2015/0220308 A1* | 8/2015 | Condon | G06F 8/20 717/104 |
| 2015/0220404 A1* | 8/2015 | Borden | G06F 11/0727 714/15 |
| 2015/0220553 A1* | 8/2015 | Poon | G06F 17/30867 707/722 |
| 2015/0309770 A1* | 10/2015 | Findlay | G06F 8/34 717/109 |

* cited by examiner

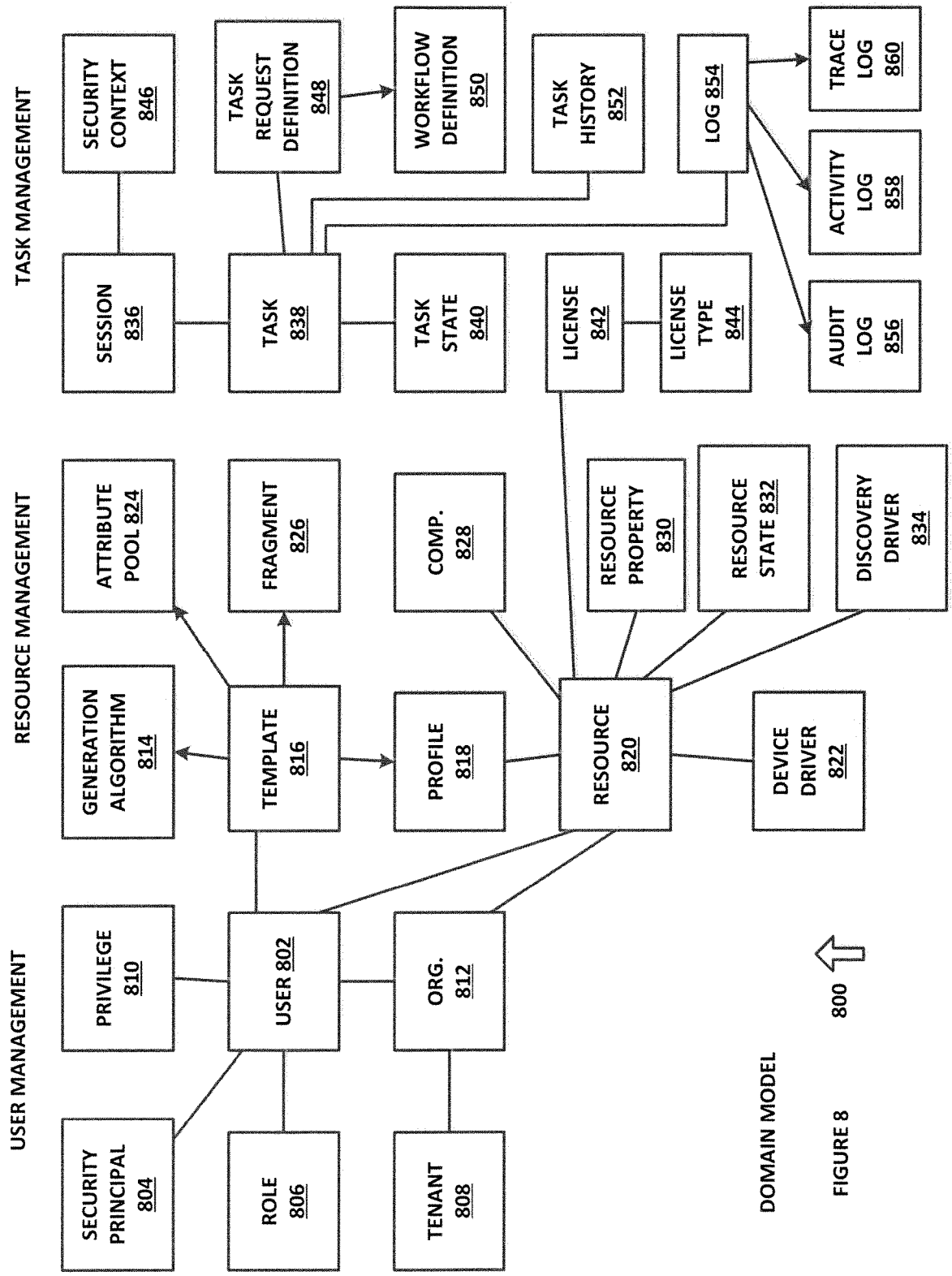

AGILE FRAMEWORK FOR VERTICAL APPLICATION DEVELOPMENT AND DELIVERY

TECHNICAL FIELD

The present invention relates to enterprise software development and management, and more specifically to an agile framework for vertical application development and delivery.

BACKGROUND OF THE INVENTION

Enterprise software development and management is a complex field, with few standardized practices. As a result, there is a general lack of structure for developing and managing such software that results in much duplicated effort.

SUMMARY OF THE INVENTION

A software development platform is provided that includes one or more user-selectable modular units containing a vertical stack of back-end business logic, one or more user-selectable modular units containing domain model components, and one or more user-selectable modular units containing front end presentation components. A virtual appliance includes application-specific logic that utilizes one or more of the modular units containing the vertical stack of back-end business logic, one or more of the user-selectable modular units containing the domain model components and one or more of the user-selectable modular units containing front end presentation components.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 8 is a diagram of a domain model in accordance with an exemplary embodiment of the present disclosure.

DETAILED DESCRIPTION OF THE INVENTION

Figure 1:
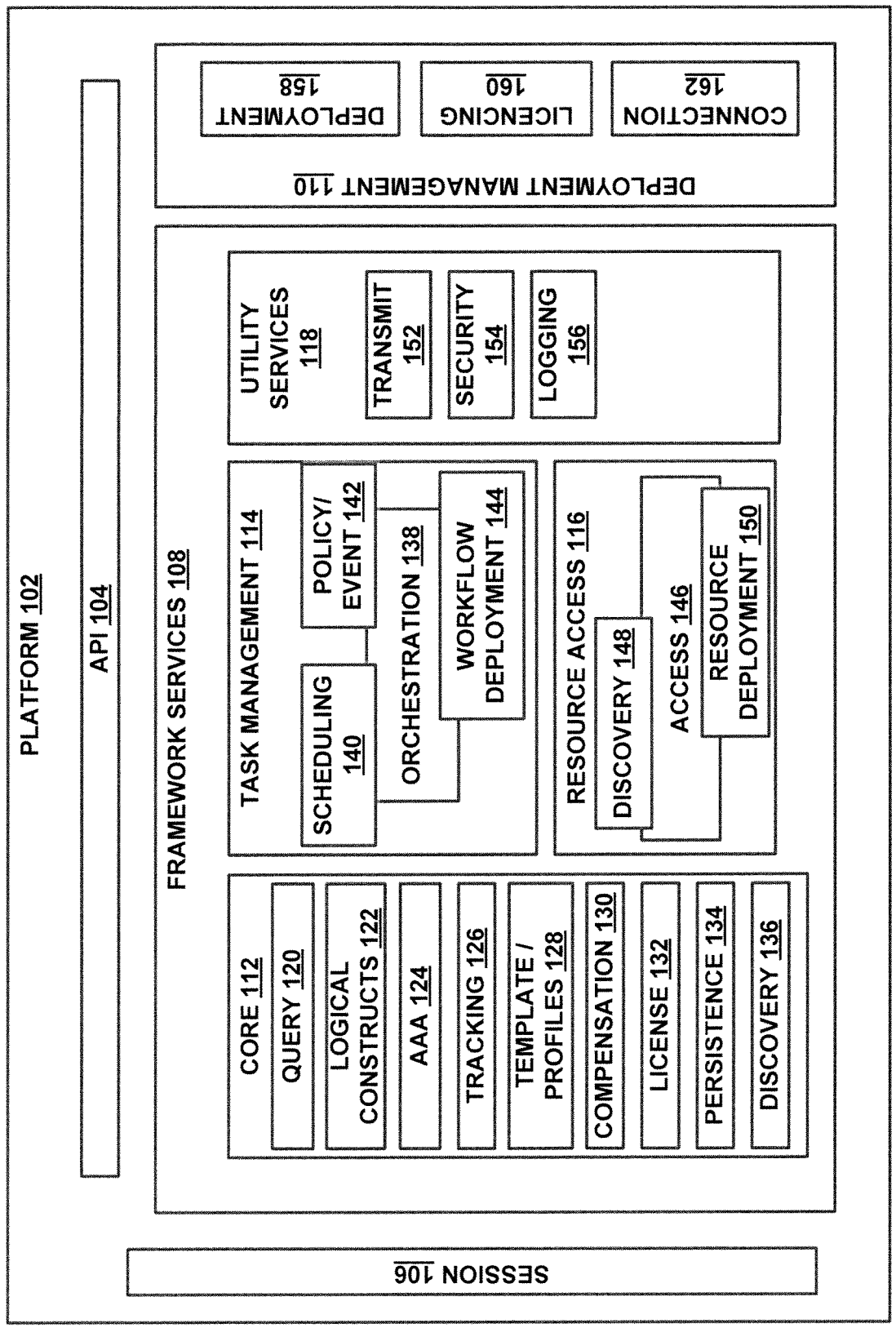
FIG. 1 is a diagram of a system for providing an agile framework for vertical application development and delivery, in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

A framework is required that allows rapid development of Converged Infrastructure (CI) applications that are optimized for agile style. In particular, the proposed framework allows application features to be developed from the user interface to the south bound device drivers (end-to-end). The framework also allows applications to be deployed as modular units dynamically at runtime, to enable in-service deployment and upgrade. These applications can handle new devices or modify existing application logic dynamically without a rebuild/recompilation of the application, or even restart.

FIG. 1 is a diagram of a system 100 for providing an agile framework for vertical application development and delivery, in accordance with an exemplary embodiment of the present disclosure. System 100 can be implemented in hardware or a suitable combination of hardware and software, and can be one or more software systems operating on a general purpose processor.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor can include a microcomputer or other suitable controller, memory devices, input-output devices, displays, data input devices such as keyboards or mice, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

In the domain of CI, applications have to handle an ever increasing set of new devices and capabilities. When applications are delivered as a monolithic unit, changes or additions require rebuild of the whole application. In addition, it is hard to develop features independently due to the tight coupling. In an agile development process, it is optimal when application features can be developed end-to-end vertically and in parallel, by multiple scrum teams. System 100 is optimized to provide support for such end-to-end vertical and parallel development.

System 100 includes platform 102, which is a development platform that can be implemented across a number of networked devices, such as servers, desktop processors, laptop processors, tablet processors and other suitable devices. Application programming interface (API) 104 allows platform 102 to interface with other systems, components and devices. Session layer 106 provides a mechanism for opening, closing and managing a session between end-user application processes, such as by managing requests and responses that occur between applications, remote procedure calls (RPCs) or other suitable functionality.

System 100 further includes framework services 108 and deployment management 110. Framework services 108 include the services required to support vertical application development and delivery, and deployment management 110 includes the services required to deploy the applications within a network environment. Framework services 108 include core 112, task management 114, resource access 116 and utility services 118, and deployment management 110 includes deployment service 158, licensing 160 and connection 162.

Deployment service 158 provides dynamic deployment and upgrades using a business logic engine, and can deploy business logic, a custom Northbound API or external facing API (NBI), drivers, resource definitions and task definitions for a component. The scripting and service access capability can be used to provide access to dynamically added resources. In one exemplary embodiment, an Open Services Gateway Initiative (OSGi)-based container can be used to provide dynamic dependence management and basic device driver management, and an OSGi framework can be used to provide customized driver mapping. OSGi is a module system and service platform for the Java programming language that implements a complete and dynamic component model, and is available from the OSGi Alliance at http://www.osgi.org/. Although the service look up is not scalable in traditional OSGi, the present disclosure augments the framework with a database-backed scalable solution to allow in excess of one million services to be deployed, whereas existing OSGi implementations can only handle 100,000 device services. This additional capacity greatly extends the scale of the existing OSGi containers to allow the overall system to scale, and also handles in-service upgrades and new device types. For the presentation layer and external API, the framework combines a Web Services framework with OSGi dynamic deployment to allow applications to dynamically deploy and make a representational state transfer (REST) application interface available. The framework provides a deployment service to allow the discovery, registration and activation of all the extensible components: application logic, device drivers and north bound web endpoints. The framework defines deployment unit formats and provides validation, lookup, versioning control. Applications components will be packaged as deployment units and can be installed and activated in a running instance.

Core 112 provides meta model and data services in support of vertical application development and delivery. These meta model and data services include the following.

Query service 120—provides a query language and a query engine that allow ad hoc domain-specific query terms. Domain-specific query terms can correspond directly to concepts or entities in the application domain, so as to be intuitive to users. In one exemplary embodiment, the set of domain-specific query terms can be expanded without a change in the query language or the engine, to allow applications to easily accommodate domain changes without being rebuilt. After a new or changed domain model is deployed, the query engine can answer ad hoc new queries using new domain vocabulary corresponding to the newly deployed model, where the engine does not need to be provided with data defining the new domain model in advance of responding to the queries. To enable this functionality, the query engine and the back end can use an XML schema to model the domain and leverage XML path language (Xpath) query support from the database. The query engine can translate query terms into Xpath queries and the queries can be answered by the database. This coupling of a domain-specific language and a flexible back-end model can be used to enable ad hoc domain-specific queries.

Logical constructs 122 include the business logic that an application will need to provide. In regards to the application platform, logical constructs 122 also provide the environment to define, deploy, execute and update the logic. In one exemplary embodiment, the logic can be implemented as Business Process Model and Notation (BPMN), a standardized logic model provided by Object Management Group at http://www.bpmn.org/. Logical constructs 122 can further provide a graphical environment for defining and modifying the business logic. An OSGi bundle can be used to package, deploy and upgrade the logic dynamically. During runtime, the application platform can execute the logic. In another exemplary embodiment, the logic can include the following constructs:

Branch
Conditional (If-Then-Else)
Concurrent Action
Loop
Long running tasks with Asynchronous Continuation
Exception and Error Handling
Automatic Transaction/Compensation
Resource Access Endpoint In addition, hooks for a generic BPMN engine can be provided to access other services provided by the platform and applications, such as logging services, transaction services and device drivers.

Authentication, Authorization and Accounting (AAA) service 124—provides authentication, authorization and accounting configuration and integration into the agile framework for vertical application development and delivery. In addition, AAA service 124 can provide role management and user management, can manage certificates and can perform other suitable functions.

Tracking service 126 provides tracking functionality for applications, such as to track services that users are accessing for load management, scheduling, trouble-shooting or other suitable purposes.

Template/profiles service 128—provides a self-contained, extensible model for representing devices along with a consistent, well-defined set of semantics. These models contain both the data and logic. The extensible units can be added to, removed from, or upgraded within the framework independent of changes to other framework components, including other pluggable units. The extensible units, which can also be called "templates" or "resource models," can capture the state information modeled for the device. A "driver" can also be used to allow interaction with the device, and can be delivered as part of the pluggable resource model as executable code that adheres to a defined format, which enables it to be plugged in a fashion similar to templates and models. Models of real world devices can be implemented using these templates, which capture not only relevant state information but also required behavior to interact with the device, in order to both read device state and also to change it. The advantages of this approach are several. First, these self-contained models can be used to capture the data in a uniform manner, such as templates that are created in a framework-defined descriptive form that lists the structure and types of state information present on the devices. This configuration abstracts the template away from the implementation details of the framework which processes it. Second, this approach allows the device modeler to create an end-to-end representation of a device, which encapsulates the information and logic required to add support for a new device into a deployable unit.

Compensation service 130—allows the current state of a target resource to be gathered and stored, prior to initiating user-defined logic in a workflow or sub-workflow, which can be stored in memory, in a persistent database with transactional semantics or in other suitable manners. In the case of a failure within the workflow or a sub-workflow, the stored state can be used to restore the target devices to their pre-workflow state. A mechanism of error propagation is used whereby errors in sub-workflows are propagated to their parent workflow for processing. This extensible, well-defined framework provision for supporting transactional semantics for updating devices allows the 'heavy lifting' of the necessary mechanics of state maintenance (fetching state and restoring state as required) to be done by the framework, thus relieving the developer of what is typically an error-prone task. Workflows that utilize this transactional functionality benefit by recovering from errors in a more controlled and predictable manner.

License service 132—provides feature and bundle licenses, resource licenses and license management for a component.

Persistence service 134—coordinates the sending of requests in a user session consistently to the same backend server. In one exemplary embodiment, persistence service 134 can be implemented as an OSGi service that other services (such as query service 120 or task management 114) can invoke to persist and retrieve objects to and from a database. Persistence service 134 provides an extensible model which gives application developers the ability to extend the model without framework changes. For example, application developers can add their own definitions for resources, relationships, configuration templates or other functionality. There are also other persistence needs for users, tasks and other objects.

Discovery service 136—provides network protocols which allow automatic detection of devices and services offered by these devices on a computer network. Discovery service 136 allows a software agent to make use of the services of another software agent without the need for continuous user intervention.

Task management 114 provides management for user tasks, service tasks or other suitable tasks, and includes scheduling 140, policy/event 142 and workflow deployment 144, which are coordinated through orchestration 138.

Scheduling 140 allows tasks to be scheduled at predetermined times, after predetermined events or triggers, or in other suitable manners.

Policy/event 142 provides a rule-based system where policies define what type of event patterns are of interest to the system, and what action should happen when the event patterns occur. The platform provides the mechanism to deliver event data to policy/event 142 and allows policies to be defined on a per message type/topic basis. In one exemplary embodiment, policy/event 142 can be implemented using the Business Rule Management System (BRMS) Dave's Recycled Object-Oriented Language (DROOL) policy engine or other suitable policy engines. Examples of events include: SNMP events from managed devices, events generated by platform services (exceptions, alarms, alerts) and events coming from external systems.

Orchestration 138 can be BPMN orchestration that uses standard notation to capture business logic and that is declarative, visualized and managed in one place. Orchestration 138 can also provide clear separation of design time and runtime, and can be used for the dynamic deployment of business logic.

Resource access 116 includes access 146, which utilizes discovery 148 and deployment 150 to provide access to resources for an appliance.

Utility services 118 includes transmit 152, security 154 and logging service 156, which provides utility services to an appliance.

Figure 2:
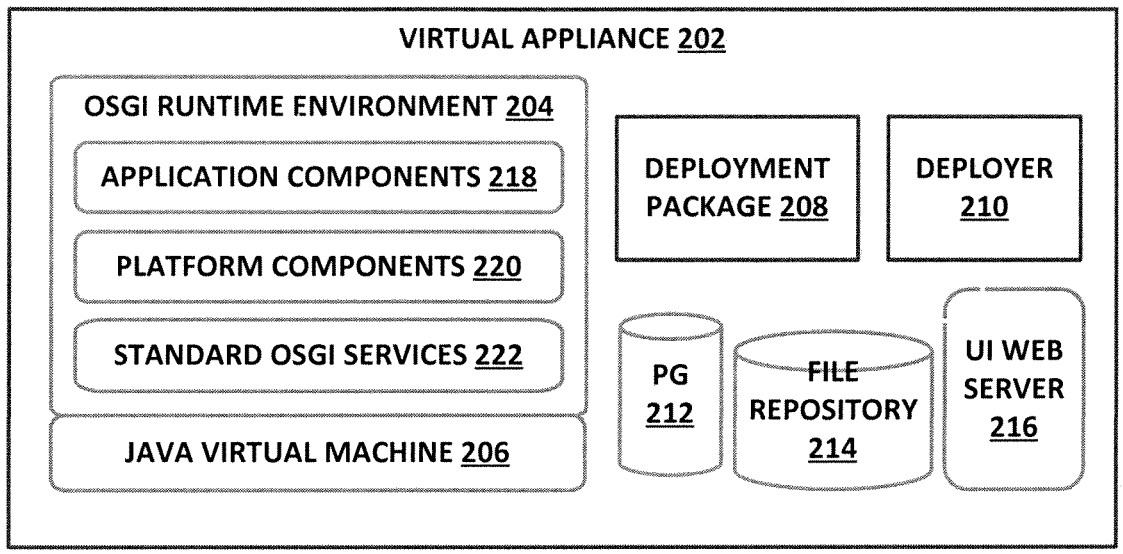
FIG. 2 is a diagram of system for providing a deployment environment for a virtual appliance in accordance with an exemplary embodiment of the present disclosure.

FIG. 2 is a diagram of system 200 for providing a deployment environment for a virtual appliance in accordance with an exemplary embodiment of the present disclosure. System 200 includes virtual appliance 202, which includes OSGi runtime environment 204, Java Virtual Machine 206, deployment package 208, deployer 210, PG (PostgreSQL) 212, file repository 214 and UI webserver 216, each of which can be implemented in hardware or a suitable combination of hardware and software.

Virtual appliance 202 is a virtual machine image running on a virtual platform that eliminates the installation, configuration and maintenance costs associated with running complex stacks of software. OSGi runtime environment 204 is a module system and service platform for the Java programming language that implements a complete and dynamic component model for the virtual appliance, and includes application components 218, platform components 220 and standard OSGi services 222. Application components 218 are provided for the virtual appliance in the form of bundles for deployment that can be remotely installed, started, stopped, updated, and uninstalled without requiring a reboot, where management of Java packages/classes is specified in great detail. Platform components 220 define what methods and classes are available for the different platforms that the virtual appliance will be supported on in the network environment. Standard OSGi services 222 provides a services layer that connects application component bundles in a dynamic way by offering a publish-find-bind model for Plain Old Java Interfaces (POJI), Plain Old Java Objects (POJO), or other suitable components.

Java Virtual Machine 206 is a virtual machine that is configured to execute Java byte code. Deployment package 208 defines deployment unit formats for the virtual appliance and provides validation, lookup and versioning control. Applications components can be packaged as deployment units and can be installed and activated in a running instance by deployer 210.

PG 212 provides persistent data storage. In one exemplary embodiment, PostgreSQL can be used, as well as other suitable data bases. PG 212 can be used to persist data such as device configuration, states, user information, logs, audit information, job history or other suitable data.

File repository 214 provides system access to virtual appliance files, and UI webserver 216 supports the user interfaces for the virtual appliance.

In operation, system 200 provides an alternative expression of selected aspects of the present disclosure. System 200 can be used as shown or in conjunction with the other exemplary features and embodiments disclosed herein.

Figure 3:
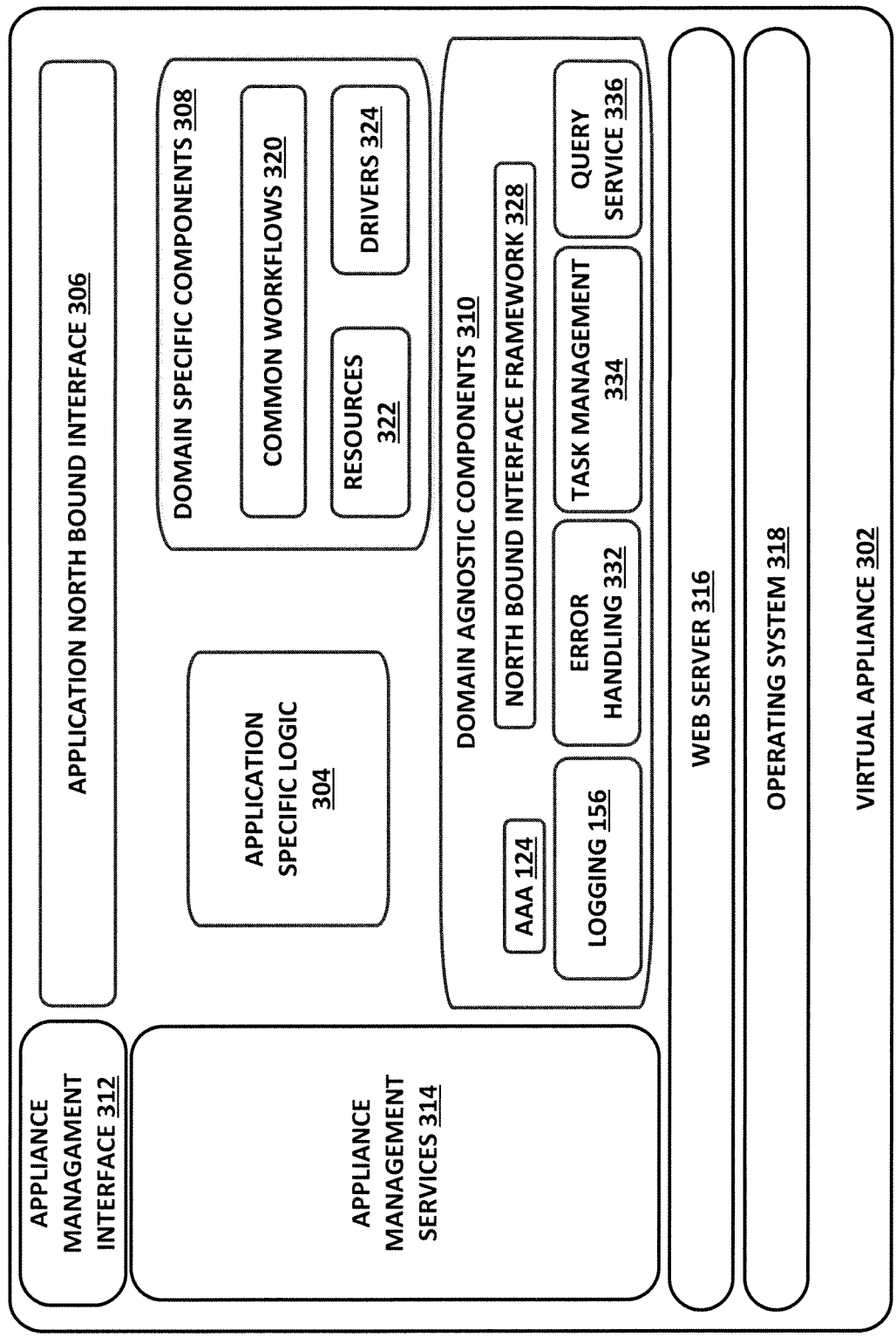
FIG. 3 is a diagram of system for providing an application stack for a virtual appliance in accordance with an exemplary embodiment of the present disclosure.

FIG. 3 is a diagram of system 300 for providing an application stack for a virtual appliance in accordance with an exemplary embodiment of the present disclosure. System 300 includes virtual appliance 302 which includes application-specific logic 304, application north bound interface 306, domain-specific components 308, domain-agnostic components 310, application management interface 312 and appliance management services 314, each of which can be implemented in hardware or a suitable combination of hardware and software.

Application-specific logic 304 of virtual appliance 302 includes the application-specific logic for virtual appliance 302, such as resource and driver models. Application-specific logic 304 defines its own domain-specific model and does not require a data access object layer. Virtual appliance 302 can deploy and is able to support the addition and removal of different domain-specific components 308 and the addition and removal of application-specific logic 304. When application-specific logic 304 is added or removed, that change can also affect the business logic 506, and can result in the addition or removal of configuration template 520, configuration fragment 522, configuration attribute pool 524, task request definition 526 and workflow definition 532. The components that track these changes and execute the new modules include task manager 530, workflow engine 528, resource configuration manager 518, discovery service 536, resource service 538 and inventory service 540.

Application north bound interface 306 is an application programming interface that is used to interface with the south bound interface of a higher-level component.

Domain-specific components 308 include common workflows 320, resources 322 and drivers 324 that are available within a predetermined domain, such as those using domain-specific queries, domain-specific terms, domain-specific templates and other domain-specific components.

Domain-agnostic components 310 include AAA service 124, northbound interface framework 328, logging service 156, error handling 332, task management 334 and query service 336. AAA service 124 provides a framework for intelligently controlling access to computer resources, enforcing policies, auditing usage, and providing the information necessary to bill for services. Northbound interface framework 328 identifies lower level details such as data or functions that are used within virtual appliance 302. Logging service 156 provides logging functions for virtual appliance 302. Error handling 332 provides error handling functions for virtual appliance 302. Task management 334 and query service 336 provide the associated task management and query service functions for virtual appliance 302.

Appliance management interface 312 provides an interface to an appliance for management applications. Appliance management services 314 provides services to an appliance.

In operation, system 300 provides an alternative expression of selected aspects of the present disclosure. System 300 can be used as shown or in conjunction with the other exemplary features and embodiments disclosed herein.

Figure 4:
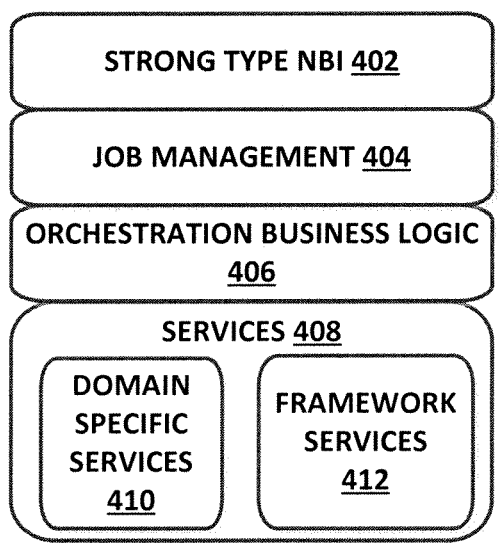
FIG. 4 is a diagram of a system for providing vertical development and delivery in accordance with an exemplary embodiment of the present disclosure.

FIG. 4 is a diagram of a system 400 for providing vertical development and delivery in accordance with an exemplary embodiment of the present disclosure. System 400 includes strong-type north bound interface (NBI) 402, job management 404, orchestration business logic 406 and services 408, each of which can be implemented in hardware or a suitable combination of hardware and software. Strong-type NBI 402 can include an application-pluggable REST API that is pluggable in the NBI and that matches end-to-end to business logic and device capability.

Job management 404 can be defined by the application and can include schedules, maintenance windows, triggers and other job management functionality.

Orchestration business logic 406 can be defined by business logic that is provided by the application and can include hardware assignments on boarding, workload deployment, compliance checking and other suitable orchestration business logic.

Services 408 can be implemented as OSGi services such as driver services, model services, framework services or other suitable services.

The disclosed framework allows rapid development of CI software applications in a manner that is optimized for an agile development environment. Software application features can be developed end-to-end, from the user interface to the south bound device drivers. Software applications can also be deployed as modular units, dynamically at runtime. This deployment capability enables in-service deployment and upgrade, and allows software applications to handle new devices or modify existing application logic dynamically without rebuild or even restart.

The present disclosure provides a framework that allows software application developers to deliver software applications by providing 1) a vertical stack of back end business logic, 2) a domain model and 3) a front end presentation, each of which can be deployed as modular units. The framework of the present disclosure also facilitates dependence management and dynamic deployment, and defines how application components in different layers of the stack should work with each other. These modules can be deployed into the application at run time, to add features, for upgrades, to fix problems or for other suitable purposes.

Existing technologies include software application servers, user interface (UI) frameworks and device driver adapter frameworks, which of each address certain parts of the software application stack. However, these existing technologies do not allow end-to-end, testable features of the software application to be delivered. Software application developers have to work with multiple technologies and platforms to develop the different layers of the software application features, and dynamic deployment to allow in-service upgrades of the software application is not possible, or is limited to only part of the software application.

The disclosed framework extends and integrates a declarative business logic engine to provide a container to define and execute application-provided logic. Dynamic deployment and upgrade are handled by the business logic engine. The scripting and service access capability is enhanced to provide access to dynamically-added resources.

OSGi-based containers are used to provide dynamic dependence management and the basic device driver management. The OSGi framework is extended to allow customized driver mapping. In traditional OSGi, the service look-up is not scalable. The disclosed framework augments the OSGi service look-up with a database-backed scalable solution to allow a scalable number of services. Whereas existing OSGi service look-up implementations can only handle 100,000 device services, using the disclosed architecture allows over one million device services to be handled. This capability greatly extends the scale of the existing OSGi containers to allow the overall system to scale, and facilitates in-service upgrades and new device types.

For the presentation layer and north bound API, the framework combines a Web Services framework with OSGi dynamic deployment to allow applications to dynamically deploy and to make a REST application interface available. The framework provides a deployment service to allow the discovery, registration and activation of all the extensible components, such as application logic, device drivers and north bound web endpoints. The framework defines deployment unit formats, provides validation, lookup, versioning control and other suitable functions. Applications components can be packaged as deployment units and can be installed and activated in a running instance.

In operation, system 400 provides an alternative expression of selected aspects of the present disclosure. System 400 can be used as shown or in conjunction with the other exemplary features and embodiments disclosed herein.

Figure 5:
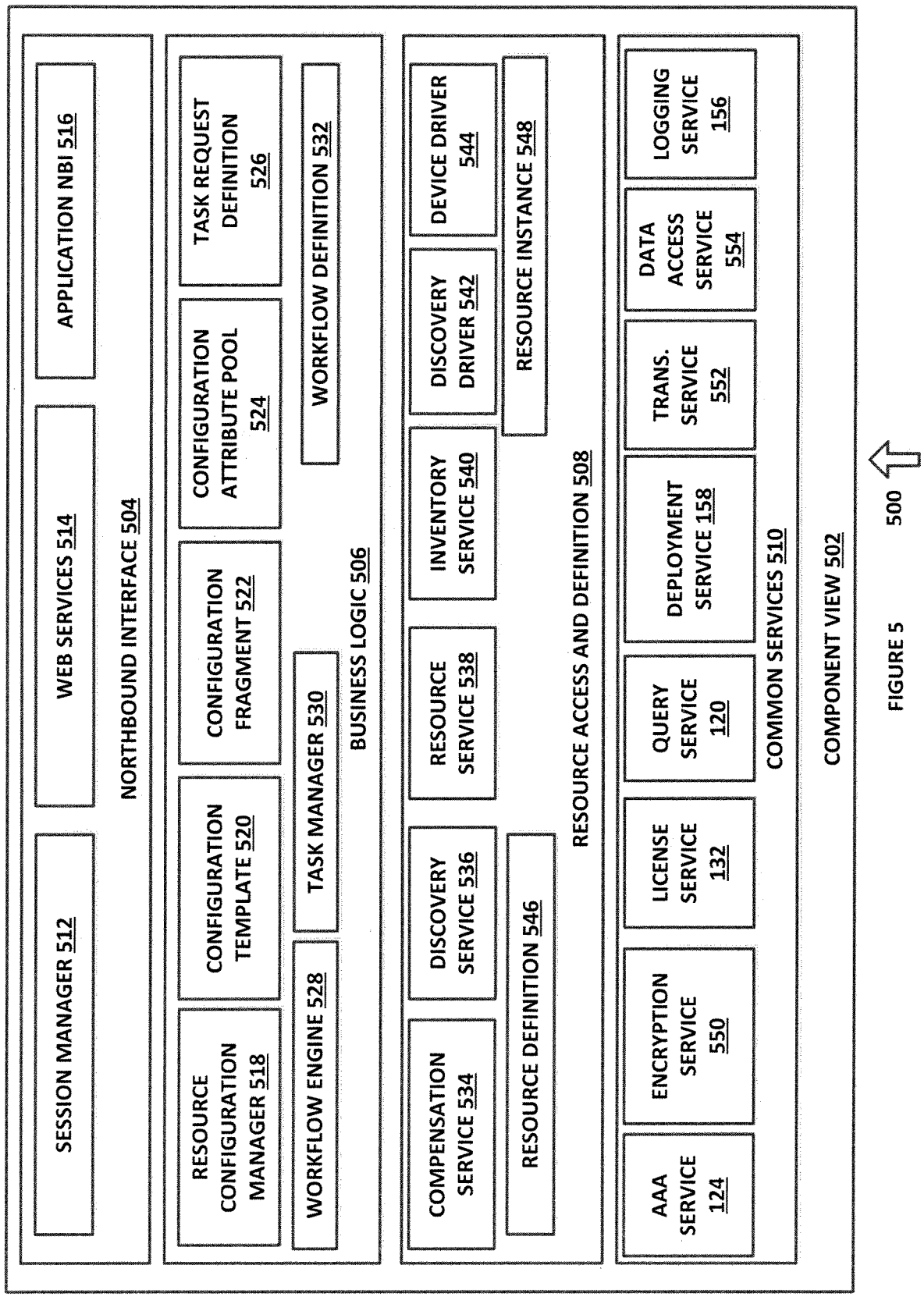
FIG. 5 is a diagram of component view in accordance with an exemplary embodiment of the present disclosure.

FIG. 5 is a diagram of component view 500 in accordance with an exemplary embodiment of the present disclosure. Component view 500 shows application features in the northbound interface 504, business logic 506 and resource access and definition 508 layers, as well as the relationship to common services 510, each of which can be implemented in hardware or a suitable combination of hardware and software.

Northbound interface 504 includes session manager 512 and web services 514, which can be implemented as system-level software applications, and application NBI 516, which provides application-specific interface functionality. Session manager 512 manages state data for a user session or other suitable sessions, such as to manage data buffers, variables or other attributes that define a user session. Web services 514 provide support for communications between software applications operating on different hardware devices, such as user devices and servers. Application NBI 516 provides application-specific interface functionality to higher layer functionality, such as user interface layers.

Business logic 506 includes resource configuration manager 518, workflow engine 528 and task manager 530, which can be implemented as system-level software applications, and configuration template 520, configuration fragment 522, configuration attribute pool 524, task request definition 526 and workflow definition 532, which provide application-specific business logic functionality. Resource configuration manager 518 establishes and maintains consistency of the functional and physical resources required for software applications, such as a configuration attribute pool, configuration grouping, policies, template and profile create, read, update and delete (CRUD), network communications, data storage and other resources.

Workflow engine 528 is a software application that manages and executes modeled computer processes, and typically makes use of a database server. Workflow engine 528 can provide compensation logic, perform error handling, perform logical branching, perform loop monitoring, perform parallel execution, perform verification of a current status, such as to check whether a command is valid in executing a task, can determine the authority of users, such as check if the current user is permitted to execute the task, can execute condition script, such as to evaluate condition script in-process to determine whether a condition is true or false, to take corresponding actions, or for other suitable purposes.

Task manager 530 can provide information about the processes and programs running on a computer, as well as the general status of the computer. Some implementations can also be used to terminate processes and programs, as well as change the processes priority. Task manager 530 can also monitor a task, pause a task, queue a task, recover a task, resume a paused task, schedule a task, start and stop a task and perform other suitable functions.

Configuration template 520 provides application-specific configuration templates, such as for file configurations.

Configuration fragment 522 provides fragment tracking for application-specific configuration program fragments, and can be a subset of a configuration template. Configuration fragment 522 can correspond to a logical grouping of configurations that form a reusable unit of configurations. In one exemplary embodiment for servers, a configuration fragment can be provided for virtualization settings in the BIOS that are optimized for running virtual machine monitors, whereas for switches, a fragment for port settings can be provided that allows converged traffic of storage and web.

Configuration attribute pool 524 can be used for identity pools such as IP address pools, worldwide port name (WWPN) pools, MAC address pools, Internet small computer system interface (ISCSI) pools, host name prefix pools or other suitable pools. In one exemplary embodiment, a template or fragment can be provided for an IP address IPAddress=from IP Pool P123456, which signifies that the IPAddress should be from a pool called P123456. At runtime, when the configuration is applied, resource service 538 code can obtain an IP address from this pool. In data centers, a central location can be provided to manage identities. Each group can get its own pool to optimize allocation and avoid any collision. In a virtualized environment, it is also important to provide a central location to manage identities, because the identity is not associated with physical hardware itself.

Task request definition 526 provides task request parameters in response to a task definition request.

Workflow definition 532 defines a workflow for a component. In one exemplary embodiment, the workflow can include processes, resources and services that are used to implement an appliance.

Resource access and definition 508 layer includes compensation service 530, discovery service 536, resource service 538, inventory service 540, discovery driver 542 and device driver 544, which are system level software applications, and resource definition 546 and device driver instance 548, which are application-specific software applications. Adding or removing a domain can affect resource access and definition 508 layer, because that can include adding or removing discovery drivers 542 and device drivers 544, along with resource definitions 546 and resource instances 548, all of which are domain-specific, and where a version of each one exists per domain.

Compensation service 530 can enlist resources, provide a nested compensation stack, perform rollback, obtain a snapshot of the current status and can perform other suitable functions.

Discovery service 536 can discover new resources given connection information, such as IP address and credentials. Resource service 538 can manage resource definitions, perform resource lifecycle management and obtain resource status data.

Inventory service 540 performs CRUD operations for a resource persistence state, resource service 538 and other suitable functions.

Discovery driver 542 is used by discovery service 536 to communicate with an unknown device to establish its identity.

Device driver 544 contains the logic to communicate with a specific type of device.

Resource definition 546 contains the state information for a type of resource.

Resource instance 548 is used by resource service 538 to communicate with a specific resource.

Common services 510 include AAA service 124, encryption service 550, license service 132, query service 120, deployment service 158, transaction service 552, data access service 554 and logging service 156, each of which are system level software applications.

Encryption service 550 performs encryption, decryption and signing of data for appliances.

Transaction service 552 performs distributed transaction processing for appliances and can obtain a transactional snapshot for a transaction as needed by an appliance or for other suitable purposes.

Data access service 554 provides data access objects for the framework core and resources as needed by an appliance.

Logging service 156 performs activity, audit and trace logging, and provides log services as needed by an appliance.

In operation, component view 500 provides an alternative expression of selected aspects of the present disclosure. Component view 500 can be used as shown or in conjunction with the other exemplary features and embodiments disclosed herein.

Figure 6:
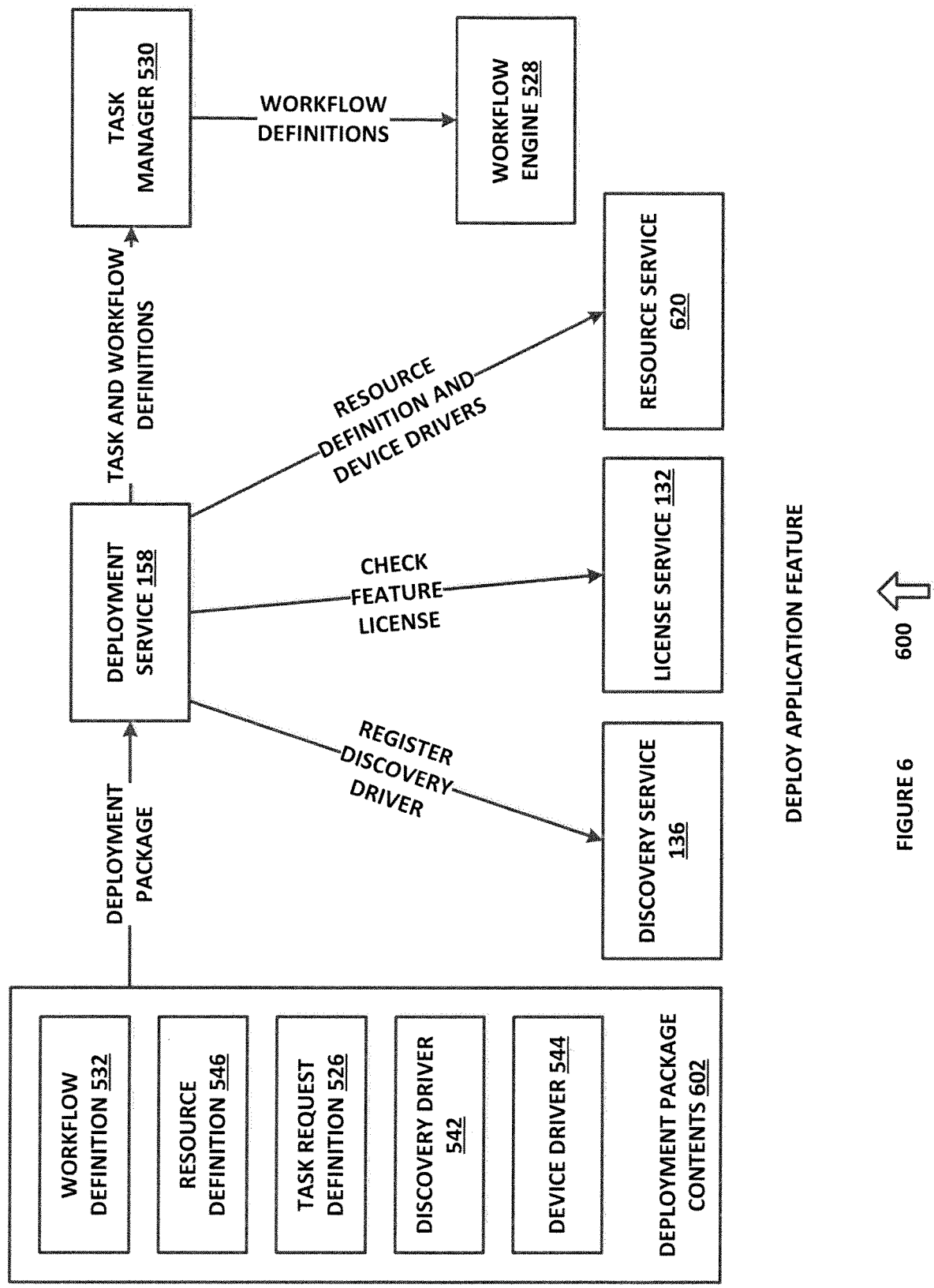
FIG. 6 is a diagram of a process for deploying an application feature in accordance with an exemplary embodiment of the present disclosure.

FIG. 6 is a diagram of a process 600 for deploying an application feature in accordance with an exemplary embodiment of the present disclosure. Process 600 can be implemented in hardware or a suitable combination of hardware and software, and can be one or more software applications operating on a processor platform.

Process 600 begins at 602, where deployment package contents are generated. In one exemplary embodiment, the deployment package contents can include workflow definition 532, resource definition 546, task request definition 526, discovery driver 542, device driver 544 and other suitable components. The deployment package is then provided to deployment service 158, which manages deployment of the deployment package. In one exemplary embodiment, deployment service can register the discovery driver through discovery service 136, can check feature licenses through license service 132, can obtain resource definitions and device drivers through resource service 620 and can perform other suitable functions. The task and workflow definitions are then provided to task manager 530, which performs task management for the tasks associated with the application. Task manager 530 also provides workflow definitions to workflow engine 528, which processes the workflow definitions for the feature.

Figure 7:
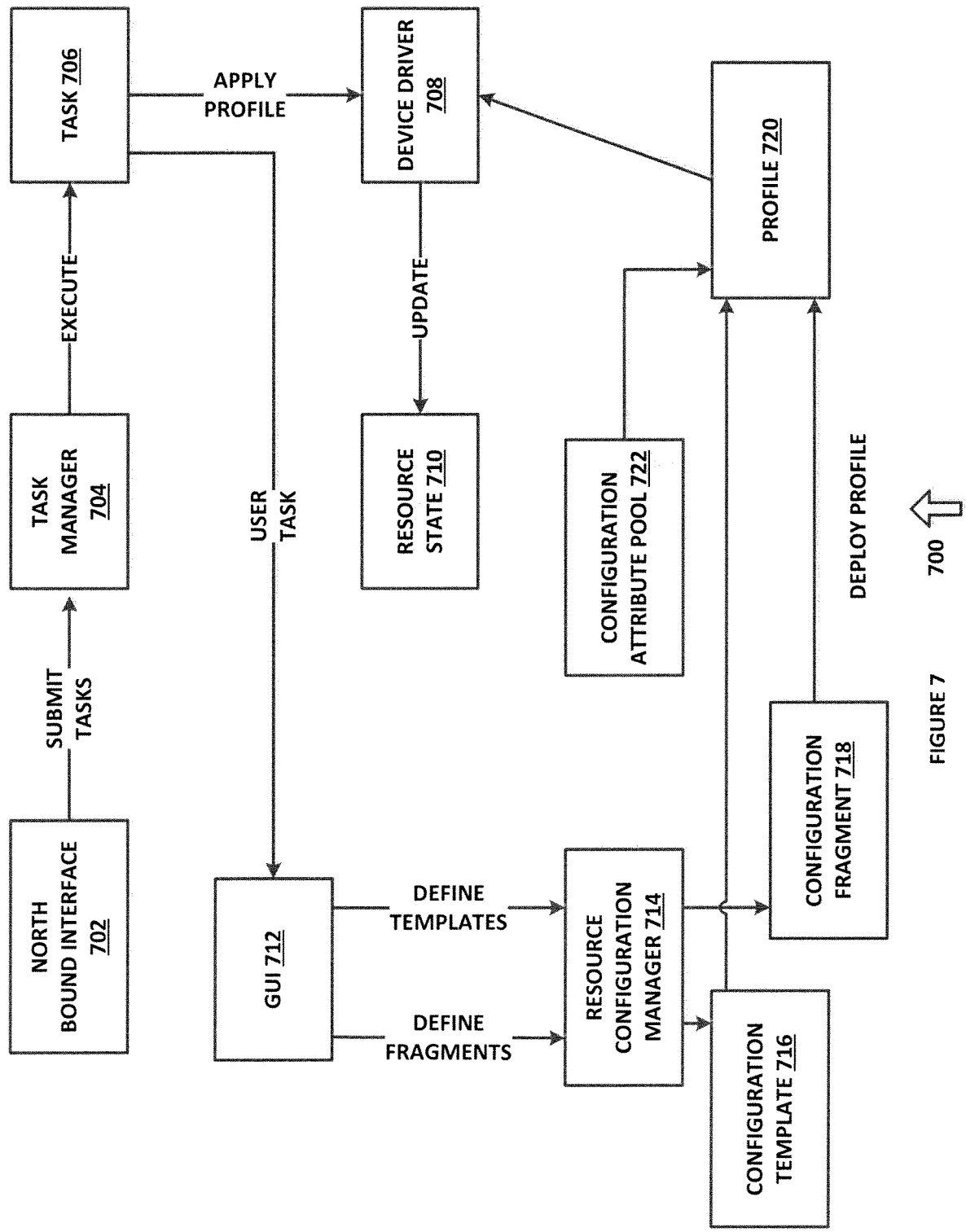
FIG. 7 is a diagram of a process for deploying a profile in accordance with an exemplary embodiment of the present disclosure.

FIG. 7 is a diagram of a process 700 for deploying a profile in accordance with an exemplary embodiment of the present disclosure. Process 700 can be implemented in hardware or a suitable combination of hardware and software, and can be one or more software applications operating on a processor platform.

Process 700 begins at 702 where a northbound interface submits tasks to a task manager at 704. The task manager executes the task at 706, and a profile is applied to a device driver at 708 and a user task is implemented through a user interface at 712. The user interface is used to define fragments and templates, which are provided to a resource configuration manager at 714. Configuration templates are provided to a profile at 716 and configuration fragments are provided to the profile at 718. The profile also receives configuration attribute pool 722, and the profile is provided to the device driver at 720. The device driver updates the resource state at 710.

FIG. 8 is a diagram of a domain model 800 in accordance with an exemplary embodiment of the present disclosure. Domain model 800 can be implemented in hardware or a suitable combination of hardware and software, and can be one or more software systems operating on a processor.

Domain model 800 includes a user management layer, a resource management layer and a task management layer. The user management layer includes a user 802, which has associated privileges 810, security principals 804, roles 806, organizations 812 and tenants 808, which define the user 802, and which can be declarative logic to allow them to be edited without requiring recompilation.

The resource management layer is associated to user 802 through templates 816, which have associated generation algorithms 814, attribute pools 824 and fragments 826. The resource management layer is also associated to user 802 through resources 820, which have associated device drivers 822, discovery drivers 834, resource states 832, resource properties 830, licenses 842 and compensation 828, and which are also associated with profile 81 and organizations 812.

The task management layer includes tasks 838, which are associated with sessions 836, and which have associated task states 840, task request definitions 848, task histories 852 and logs 854. Sessions 836 have associated security contexts 846. Task request definitions 848 have associated workflow definitions 850. Logs 854 have associated audit logs 856, activity logs 858 and trace logs 860. Licenses 842 with associated license types 844 are also in the task management layer.

In operation, domain model 800 provides an alternative expression of selected aspects of the present disclosure. Domain model 800 can be used as shown or in conjunction with the other exemplary features and embodiments disclosed herein.

The present disclosure facilitates a number of additional applications:

1. Extensible Data Model and Service for Infrastructure Management.

Device representations (such as device capabilities, definitions and states) and configurations within a computing infrastructure can be defined as data objects and persisted, and a data model can be used to manage the persisted device definitions, states and configurations. Device representations and configurations vary widely among vendors and generations of devices, and there are typically a large number of available devices. The present disclosure can be used to provide a method to handle the diverse, changing representations and relationships between these data objects. The present disclosure also allows an incremental and rapid development process to be used to respond to rapidly changing requirements, and to allow multiple teams to develop a domain-specific data model in parallel. The absence of such capabilities cause maintenance issues in the field, create a development bottleneck and result in a static set of devices or features.

The present disclosure can be used to provide a data service to allow adding or changing of the representations and relationships between devices for use with applications without requiring rebuilding of the applications, by providing a core, extensible data model that can be incrementally extended for applications to add and modify device types and to add and modify new relationships. A domain-specific model can be defined for each application and the model can be deployed into the processing environment core (which is typically a number of interrelated applications that provide common services) without the need to rebuild or recompile the applications that make up the processing environment core. Using the present disclosure, application models can be developed independently and in parallel of each other, to allow developers to respond quickly to new requirements, and to help streamline operations by multiple teams that can be developing applications in parallel on the same platform. Using the present disclosure, application extension data models can be deployed at runtime, such that no downtime is required for data model changes, which allows applications models to be developed in parallel.

The data service of the present disclosure provides methods for applications to perform CRUD operations on their domain-specific objects. In this regard, code is not required for applications, which can be implemented by providing schema for the data models for the application that define device representations and relationships. The data service can provide the CRUD operations through a standardized API, can preserve atomicity, consistency, isolation and durability (ACID) properties, can maintain data integrity and can manage transactional behavior across data operations.

In contrast, existing solutions try to provide a complex and hard-to-maintain data model. The upfront development effort for such a model is hard to implement incrementally and not suitable for an agile environment. The complexity of the model is not encapsulated from the application developers. If anything is left out in the model, the upgrade will usually involve a complex data migration process. Upgrades can also cause backward compatibility issues, and application rebuild and upgrade downtime is unavoidable. While noSQL options are available for handling semi-structured data, they require a significant amount of application code to perform indexing, joins, and to maintain referential data integrity. Many of the noSQL solutions do not provide the full ACID properties that are required for storing infrastructure configuration and states.

The present disclosure can be used to provide a generic resource with a type that is defined by an XML schema, which allows applications to define new types and deploy them on the fly. Relationships between resources are defined in meta data that is managed by the data service, which allows dynamic addition and modification of relationships between resources. No schema changes or downtime occurs during these modifications, and the meta data also allows the data service to process relationships. The solution provided by the present disclosure scales well with functional indexing that allows indexing into the XML payload, which significantly improves query time.

2. Ad Hoc Domain-Specific Query for System Management.

In system management, the domain-specific vocabulary (taxonomy) changes and expands rapidly with the introduction of new devices and device capabilities. System management software cannot look ahead to include the unforeseen expansion of the taxonomy, and instead typically provides canned queries that only capture the known taxonomy at design time. The system management software then needs to be periodically upgraded to expose new queries or APIs to catch up with changes, otherwise, it will be outdated quickly. These upgrades involve costly software development and upgrade cycles. To minimize potential costly changes, applications sometimes use generic terms or artificial placeholders. These models are usually abstract and are not intuitive to end users.

The present disclosure includes a query language and a query engine that allow ad hoc domain-specific query terms. These domain-specific query terms correspond directly to concepts or entities in the application domain that are intuitive to users. The set of domain-specific query terms can be expanded without changing the query language or the engine, which allows applications to easily accommodate domain changes without being rebuilt. After the new or changed domain model is deployed, the query engine can answer ad hoc new queries using new domain vocabulary that corresponds to the newly deployed model. The engine does not need to be provided with data defining the new domain model in advance.

To enable this functionality, the query engine and the backend use XML schema to model the domain and leverage Xpath query support from the database (Xpath is a query language for selecting nodes from an XML document that was defined by the World Wide Web Consortium (W3C)). The query engine translates query terms into Xpath queries that are answered by the database. This coupling of a domain-specific language and a flexible backend model enables ad hoc domain-specific queries.

Existing entity relational-based solutions can handle unknown future terms or expansion terms by creating artificial columns or placeholders, but it is difficult to use and maintain the mapping. Furthermore, domain-specific query terms cannot be supported. These existing entity relational-based solutions typically require development and data migration when the domain model changes. The disclosed domain-specific API allows canned domain-specific queries, but that approach is not standards-based and also requires a new API for new queries, and as such, is not suitable for ad hoc queries.

The present disclosure uses a query language that is based on the Java Persistence Query (JPQ), which is a platform-independent object-oriented query language defined as part of the Java Persistence API (JPA) standard, with extensions for traversing nested model structures, and which can accommodate filters and expressions using domain-specific terms. The query engine can translate the query into a native database query. There is no mapping file required, such as is used in Hibernate or OpenJPA. The engine can also work with multiple backend query services. A dynamic mapping of query terms to query services is provided by the query service. The present disclosure leverages the flexible modeling provided by the XML schema and database support of Xpath query and indices, which allows ad hoc queries when coupled with the query language.

3. Declarative and Pluggable Business Logic for Systems Management.

A system management platform hosts a wide variety of services. Applications written on top of the system management platform utilize a workflow to express the logic that stitches together several services in order to execute a use-case. The framework of the system management platform of the present disclosure supports plugging in these workflows or application-specific jobs in the running system. In addition, application developers and solution developers can add new workflows or jobs in a declarative manner, so that the workflow definition can be modified if the underlying business needs change.

The present disclosure combines the standardization, familiarity and declarative nature of BPMN with a service oriented, resilient, and agile framework, which allows application or solution developers to author new jobs or workflows in standardized BPMN syntax, such that the framework can automatically process these artifacts during deployment, leveraging dynamic deployment of OSGi. Each new job can be assembled in a separate bundle and deployed to the system running the framework, because the framework can automatically find new jobs and process them for later execution. This synergistic combination of declarative logic in standard notation and dynamic deployment services results in a system that provides a fully-integrated environment where new requirements can be translated into business process changes, then into design, and then into implementation and deployment.

The present disclosure splits each new job or workflow into a job definition and a job model. The job definition contains a declarative BPMN representation of the business logic, and the job model contains input data needed for the job execution. The new job or workflow is then deployed as separate bundles in the OSGi-based framework, and OSGi bundle listeners listen to these new jobs bundles. An open source BPMN engine such as jBPM or Activiti can be used to validate and process the declarative job definitions.

4. Pluggable Models and Pluggable Templates.

In the domain of CI, applications face an increasing number and variety of devices which need to be accommodated in order to meet business and marketplace requirements. Traditionally, applications have utilized a number of different approaches to mitigate the problem of integrating new devices. However, for the most part these approaches suffer from several problems. First, there is frequently a higher than desired degree of coupling between the device-specific components and the remaining system components, which impedes adding new devices or changing existing ones. Second, data defining device attributes and behavior often ends up being distributed across components and layers, which makes changing such data difficult. For example, it is not uncommon for there to be multiple representations of device types within the same system, none of which fully captures the state and semantics associated with the device and separates it from the other framework components.

The present disclosure utilizes a mostly self-contained model for representing devices along with a consistent, well-defined set of semantics. These units can be added to, removed from, or upgraded within the framework independent of changes to other framework components, including other pluggable units. These declarative units, called "templates" and "resource models" capture the state information that is modeled for the device. In addition, a "driver" is also provided to allow interaction with the device. This driver is delivered as part of the pluggable resource model, as executable code which adheres to a defined format and which enables it to be plugged in a fashion similar to templates and models.

Using the present disclosure, developers can create models of real world devices which capture not only relevant state information but also required behavior to interact with the device in order to both read device state and also to change it. There are numerous advantages to this approach. First, a mostly declarative model is used where possible. For example, templates are created, in a framework-defined descriptive form, that list the structure and types of state information present on the devices, and which abstracts the template away from the implementation details of the framework that processes it. Second, the present disclosure enables the device modeler to create an end-to-end representation of a device, which encapsulates the information and logic required to add support for a new device into a deployable unit.

5. Undo Configuration Transactional Compensation.

One function of the disclosed CI management system is to allow administrators to apply changes to the state of managed devices in a well-defined manner. These changes can be due to required updates, to remediate compliance violations, or for a variety of other reasons. The changes can be accomplished in a variety of ways, but typically involve logic which defines the operations and input to perform against the set of target resources. The logic can be composed of multiple steps or activities that are executed in a particular order, which achieves the desired state changes. In the case where one or more of these steps fails, it is desirable to restore the state of the target devices to that which existed prior to the start of the operation, in order to avoid leaving devices in an indeterminate or broken state. In short, it is desirable that the activities and sub-activities in a "job" being run by an administrator to update devices are capable of having transactional semantics, to the extent possible.

The framework of the present disclosure allows for user-defined workflows to be deployed for execution. These workflows can be composed of smaller workflows nested to the level required by the business logic. Each of these sub-workflows has a well-defined start and end point to which the workflow execution engine has access and into which logic may be added. In addition, the framework maintains representations of the resources (devices) which have the ability to read and write state. The workflow and sub-workflow boundaries can be augmented to allow for automatic state maintenance, and to support transactional semantics. Participation in transactional semantics is optional and can be on a per-workflow or sub-workflow basis. Specifically, prior to actually initiating the user-defined logic in a workflow or sub-workflow, the current state of the target resources can be gathered and stored in memory, in a persistent database with transactional semantics, or in other suitable manners. In the case of a failure within the workflow or a sub-workflow, the stored state can be used to restore the target devices to their pre-workflow state. In order to fully support this functionality, a mechanism of error propagation is provided whereby errors in sub-workflows are propagated to their parent workflow for processing. There are numerous benefits to having an extensible but well-defined framework for supporting transactional semantics for updating devices. First, the 'heavy lifting' of the necessary mechanics of state maintenance (fetching state and restoring state as required) is done by the framework, thus relieving the developer of this error-prone task. Also, for end users, workflows that utilize this transactional functionality benefit by recovering from errors in a more graceful, controlled and predictable manner.

6. Model Based Development.

Much of contemporary traditional software development follows object-oriented practices in order to achieve the goals of higher quality, ease of maintenance, and ease of testing, among other objectives. In general, this approach does tend to afford these benefits to one degree or another. This method typically involves analyzing requirements designing and decomposing components and their interactions and then writing code in an object-oriented style that represents the components using the language and tools of choice. This approach, while better than older procedural style approaches, still centers around code artifacts (objects or classes) as the fundamental building block of the system. There are cases where such an approach has drawbacks, such as the case of highly extensible frameworks. As extensions are made to the framework, much new code has to be added, such as domain data objects and other 'helper' objects which perform various operations and transformations within the framework. This process is time-consuming, tedious and error-prone, particularly where the framework is designed to be extended by end users and/or non-programmers.

The present disclosure provides model-based development that uses model artifacts as the basis of the development process. In the case where a system or framework is specifically designed to be extended by end users and/or non-programmers, model-based development offers improved ease of development. Model-based development is not a replacement for object-oriented development, but can utilize object-oriented development as a foundation.

In one exemplary embodiment, the models are self-contained and extensible in nature and use a standard, well-known representation, such as XML and XML Schema. These model artifacts can be a description of the objects being added to the system and can contain embedded metadata to aid in their processing, either by tools or by the framework. These models can be processed by tools to generate code or code-related artifacts, such as object classes, helper classes, transformation classes, message files, validation classes or other suitable data. Code can also be generated from these models and inserted into other existing code artifacts. The models can also be processed to produce other useful artifacts such as documentation, diagrams, and the like. While the model itself can be abstract in nature, it is the central artifact from which supplementary processing is performed to generate code, documentation, tests and other suitable items or functions. There are numerous benefits to the disclosed embodiments. In the case of end user/non-programmer extensible systems, these models are significantly easier to work with and to understand. Second, code, documentation and test artifacts can be generated based on these models, such that changing only the model and re-processing it can be used regenerate these updated ancillary artifacts, saving time and effort.

7. Domain to Framework Transformation.

The disclosed framework is extensible in order to serve as a platform upon which CI software can be built. New user-defined object models are allowed to be added to the system at runtime and without a framework recompile and restart. The representational form of these models, such as resource templates and resources, are written in a domain-specific manner. For example, in the case of user-defined templates, while the general format can be XML, the actual model content can contain identifiers which are specific to a resource. The structure of these model artifacts can also be specific to the domain resource. In this form, they are opaque to the framework as the framework has no knowledge of their specific format and contents. The framework can thus be agnostic of any particular structure and content, allowing template developers to express the business requirements of their templates in a domain-specific manner. There are points both within the framework and at framework boundaries when these models must be transformed into a format that is comprehensible by the framework for processing. These points can include framework-defined validation, returning model representations as the result of fetch or query, persistence, and other suitable points.

The present disclosure can utilize different methods to enable this translation. For resource templates, an XML schema-based approach can be used. In this manner, developers of templates can use XML and XML schema as the representational form of their template model. Further, the XML and schema can be derived from a framework-defined schema by 'restriction' and 'substitution'. Restriction allows the template developer to restrict one of a set of broader possible model elements defined in the framework-defined base schema. The restriction mechanism constrains template developers to a set of primitive model types and elements known by the framework. Substitution allows XML identifiers to be substituted (or serve as aliases) in the user-developed template model. The substitution mechanism allows the domain-specific XML identifiers in the user-developed template to be translated into known identifiers present in the framework-defined base schema. Taken together, restriction and substitution allow users to develop template models in a domain-specific manner which makes sense to them while still enabling them to be transformed automatically into a form which can be understood by the framework for processing. The code to perform this transformation is generated automatically from the template model itself, thus saving time and reducing errors.

8. Temple Derivation—Configuration Object Management.

In the disclosed framework, templates can be domain models of the updatable attributes of a particular resource type. Templates can be used as input to effect state change(s) on target resources. Templates define attribute names, types and other metadata such as default values, whether the value is 'fixed' (i.e. constant), if fixed, the actual fixed value and other suitable parameters. In contrast, a resource can be a full representation (from a framework perspective) of a real-world device or endpoint, including not only updatable attributes but also read-only attributes. As templates are developed within an organization, the proliferation of such templates can become problematic, both in terms of number and content. Also, requiring users to write templates from scratch would be too burdensome. Finally, without a programmatic method to create one template based upon an existing template, the process of writing and adapting templates to fulfill the needs of an enterprise is expensive and error prone, resulting in much duplication of effort and content.

In the disclosed framework, a process known as 'template derivation' is used to address these issues. A template can be derived from an existing template by 'fixing' attributes. An attribute marked as 'fixed' cannot have its value changed from its associated fixed value, such that a derived template is a copy of a previously existing template with one or more previously 'unfixed' attributes marked as fixed and given an associated value. Fixing of attributes can be done programmatically as well in the following manner. A caller can specify an existing template to begin the derivation process. The system can then identify attributes from this template that are not fixed, such as in a list. From this list, the caller can choose one or more attributes to mark as fixed and to provide an associated value. The list can then be returned to the framework and a new template can be created with the changes incorporated. It should be noted that the same template can be chosen as the basis for any number of derived templates. These derived templates can themselves then be further derived.

There are numerous benefits to this process. First, the process of derivation can be a process of increasing constraint, where a derived template has more fixed values than the template from which it was derived. In one exemplary embodiment, base templates can be provided 'out of the box' with no fixed values, and further refinements can be made to accommodate further specificity. In this exemplary embodiment, the first derivation of a server template can be to specify a minimum BIOS level, RAID level, virtualization settings or other settings. From this first derivation, several other templates can be derived which specify other attributes which are appropriate to particular sub-organization needs, such as templates for quality assurance servers, development servers and other suitable needs.

A strict definition of derivation allows for well-defined programmatic changes to templates that can be used to ensure that the derived templates will be compliant with framework requirements, but which enables the derivation to be presented in a form that an end user can understand. For example, a simple list of attributes could be displayed in a GUI with selection controls to allow a user to mark attributes that are to be fixed. This process can be used to enable non-programmers to derive new template models per their needs without having to understand the underlying XML or schema representation.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A software development platform comprising:
a processor;
one or more user-selectable modular units containing a vertical stack of back-end business logic;
one or more user-selectable modular units containing domain model components;
one or more user-selectable modular units containing front end presentation components; and
a virtual appliance comprising application-specific logic that includes one or more of the modular units containing the vertical stack of back-end business logic, one or more of the user-selectable modular units containing the domain model components and one or more of the user-selectable modular units containing front end presentation components.

2. The software development platform of claim 1 wherein the one or more user-selectable modular units containing the vertical stack of back-end business logic further comprises a query service, logical constructs, an authentication-authorization-accounting service, a tracking service, a template/profiles service, a compensation service, a license service, a persistence service and a discovery service, each configured for serial interaction with the other user-selectable modular units.

3. The software development platform of claim 1 wherein each of the modular units containing the vertical stack of back-end business logic, the modular units containing the domain model components and the modular units containing front end presentation components are configured to be dynamically deployed at runtime, and each are configured for serial interaction with the other user-selectable modular units.

4. The software development platform of claim 1 wherein each of the modular units containing the vertical stack of back-end business logic, the modular units containing the domain model components and the modular units containing front end presentation components are extensible, self-contained modular components, and each configured for serial interaction with the other user-selectable modular units.

5. The software development platform of claim 1 further comprising a business logic engine configured to provide a container to define and execute application provided logics using independent and distinct interaction with each of the other user-selectable modular units.

6. The software development platform of claim 5 wherein the business logic engine is configured to provide dynamic deployment and upgrade through independent modification and deployment of any one of the user-selectable modular units in any selected combination.

7. The software development platform of claim 1 wherein the one or more user-selectable modular units containing the vertical stack of back-end business logic comprises a plurality of the modular units, and wherein each of the modular units can be separately modified without any associated modifications required to the others of the modular units.

8. The software development platform of claim 1 wherein the one or more user-selectable modular units containing the vertical stack of back-end business logic comprises a plurality of the modular units, and wherein each of the modular units can be separately deployed at runtime without any associated deployment at runtime required for the others of the modular units.

9. A converged infrastructure platform comprising:
a processor;
one or more user-selectable modular units containing a vertical stack of back-end business logic;
one or more user-selectable modular units containing configuration fragments;
one or more user-selectable modular units containing domain-specific model components;
one or more user-selectable modular units containing front end presentation components; and
a virtual appliance comprising application-specific logic that includes one or more user-selectable modular units containing a vertical stack of back-end business logic, one or more of the modular units containing the configuration fragments, one or more of the user-selectable modular units containing the domain-specific model components and one or more of the user-selectable modular units containing front end presentation components.

10. The software development platform of claim 9 wherein the one or more user-selectable modular units containing the configuration fragments further comprises
a configuration template having two or more independent and distinct predetermined configuration code segments, each of the configuration code segments being modifiable without requiring any modification to the other code segment.

11. The software development platform of claim 9 wherein each of the modular units containing the configuration fragments, the modular units containing the domain-specific model components and the modular units containing front end presentation components are configured to be dynamically modified and redeployed at runtime without requiring any corresponding modifications or redployment of any of the other modular units.

12. The software development platform of claim 9 wherein each of the modular units containing the configuration fragments, and the modular units containing the domain-specific model components are declarative visual components.

13. The software development platform of claim 9 further comprising a business logic engine configured to provide a container to define and execute application provided logics.

14. The software development platform of claim 13 wherein the business logic engine is configured to provide dynamic deployment and upgrade.

15. A software development platform comprising:
a processor;
one or more user-selectable modular units containing a vertical stack of back-end business logic;
one or more user-selectable modular units containing domain model components;
one or more user-selectable modular units containing domain models of hardware devices; and
a virtual appliance comprising application-specific logic that includes one or more of the modular units containing the vertical stack of back-end business logic, one or more of the user-selectable modular units containing the domain model components and one or more of the user-selectable modular units containing domain models of hardware devices.

16. The software development platform of claim 15 wherein the one or more user-selectable modular units containing the vertical stack of back-end business logic further comprises a query service, logical constructs, an authentication-authorization-accounting service, a tracking service, a template/profiles service, a compensation service, a license service, a persistence service and a discovery service.

17. The software development platform of claim 15 wherein each of the modular units containing the vertical stack of back-end business logic, the modular units containing the domain model components and the modular units containing the domain models of hardware devices are configured to be dynamically deployed at runtime.

18. The software development platform of claim 15 wherein each of the modular units containing the vertical stack of back-end business logic, the modular units containing the domain model components and the modular units containing the domain models of hardware devices are extensible components.

19. The software development platform of claim 15 further comprising a business logic engine configured to provide a container to define and execute application provided logics.

20. The software development platform of claim 19 wherein the business logic engine is configured to provide dynamic deployment and upgrade.

* * * * *